United States Patent
Chen

(10) Patent No.: US 9,007,556 B2
(45) Date of Patent: *Apr. 14, 2015

(54) SUSBTRATE WITH PSVA MODE PAD SET AND CELL SWITCH FOR ARRAY PROCESS OF PANEL DISPLAY DEVICE, MANUFACTURING METHOD AND CORRESPONDING LIQUID CRYSTAL DISPLAY DEVICE

(75) Inventor: Cheng-hung Chen, Guandong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 318 days.

This patent is subject to a terminal disclaimer.

(21) Appl. No.: 13/521,708

(22) PCT Filed: Jun. 1, 2012

(86) PCT No.: PCT/CN2012/076373
§ 371 (c)(1),
(2), (4) Date: Jul. 11, 2012

(87) PCT Pub. No.: WO2013/177790
PCT Pub. Date: Dec. 5, 2013

(65) Prior Publication Data
US 2013/0321728 A1    Dec. 5, 2013

(30) Foreign Application Priority Data

May 30, 2012 (CN) .......................... 2012 1 0174049

(51) Int. Cl.
G02F 1/1339 (2006.01)
G02F 1/1345 (2006.01)
G02F 1/136 (2006.01)
G09G 5/02 (2006.01)
G02F 1/1333 (2006.01)
G02F 1/137 (2006.01)

(52) U.S. Cl.
CPC .............. *G02F 1/136* (2013.01); *G02F 1/1333* (2013.01); *G02F 1/1345* (2013.01); *G02F 2001/13775* (2013.01); *G09G 5/02* (2013.01)

(58) Field of Classification Search
USPC .......................... 349/149, 151–153, 155, 190
See application file for complete search history.

(56) References Cited

U.S. PATENT DOCUMENTS

| | | | |
|---|---|---|---|
| 5,233,448 A * | 8/1993 | Wu | 349/40 |
| 5,946,062 A * | 8/1999 | Hasegawa et al. | 349/58 |
| 2006/0139556 A1 * | 6/2006 | Ahn et al. | 349/153 |
| 2010/0039119 A1 * | 2/2010 | Lee et al. | 324/538 |
| 2013/0335655 A1 * | 12/2013 | Chen | 349/41 |

* cited by examiner

*Primary Examiner* — Lauren Nguyen
(74) *Attorney, Agent, or Firm* — Andrew C. Cheng

(57) ABSTRACT

The present invention provides a substrate for array process of panel display device, which includes a cell switch and a PVSA mode pad set. Cell switch includes a plurality of switches, with each connected to a pad in shorting bar pad set. PSVA mode pad set includes a scan pad and a data pad. Scan pad is connected through some switches of cell switch to scan lines, and data pad is connected through some switches of cell switch to data lines. In this manner, the present invention reduces the number of pads in PSVA mode pad set to simplify peripheral routes.

5 Claims, 6 Drawing Sheets

SUSBTRATE WITH PSVA MODE PAD SET AND CELL SWITCH FOR ARRAY PROCESS OF PANEL DISPLAY DEVICE, MANUFACTURING METHOD AND CORRESPONDING LIQUID CRYSTAL DISPLAY DEVICE

BACKGROUND OF THE INVENTION

1. Field of the Invention

The present invention relates to the field of panel displaying techniques, and in particular to a substrate for array process of panel display device, manufacturing method and corresponding liquid crystal display device.

2. The Related Arts

Recently, as the technology develops rapidly, panel displaying techniques, in particular, liquid crystal display (LCD) are widely applied in mobile phone, notebook PC, desktop display device, TV, and so on, and gradually replaces the conventional cathode ray tube (CRT) to become the mainstream display device because of the advantages of high resolution, reduced thickness, light weight, and low power consumption.

The manufacturing process of LCD device usually includes three stages, i.e., the first stage of array process, the second stage of cell process and the third stage of module process. As shown in FIG. 1, in the array process, a plurality of areas 11 corresponding to display panels is formed simultaneously on a glass substrate 10, with each of areas 11 corresponding to display panels electrically connected through a corresponding shorting bar pad set 12 to a corresponding polymer stabilization vertical alignment (PSVA) mode pad set 14 of PSVA mode pad set 13 so as to apply voltage to each display panel during array process to form pretilt angle of liquid crystal molecules. In addition, close to border of glass substrate, 10, PSVA mode pad set 13 further includes a PSVA mode color filter (CF) pad 15, electrically connected to transfer structure 16 on glass substrate 10, wherein transfer structure 16 is used for conducting vertical signals between upper and lower substrates.

Furthermore, also refer to FIG. 2. All scan lines G1, G2, . . . , Gn on each area 11 corresponding to display panel are electrically connected respectively to corresponding scan lead 17, then electrically connected to each corresponding scan pad respectively of shorting bar pad set 12 corresponding area 11, and then electrically connected to scan pad of corresponding PSVA mode pad set 14 of PSVA mode pad set 13. All data lines D1, D2, . . . , Dm on each area 11 corresponding to display panel are electrically connected respectively to corresponding data lead 18, then electrically connected to each corresponding data pad respectively of shorting bar pad set 12 corresponding area 11, and then electrically connected to scan pad of corresponding PSVA mode pad set 14 of PSVA mode pad set 13.

Also, shorting bar pad set 12 corresponding to area 11 further includes common signal pad "com" and color filter pad "CF", wherein common signal pad com is electrically connected to common electrode of area 11 and color filter pas CF is connected to transfer structure 16 of area 11 for transferring signals vertically between upper and lower substrates.

Accordingly, PSVA mode pad set 14 of PSVA mode pad set 13 further includes common signal pad "com", electrically connected to common signal pad com of shorting bar pad set 12.

Therefore, in array process, voltage is applied through pad of corresponding PSVA mode pad set 14 of PSVA mode pad set 13 for pretilt angle processing of liquid crystal molecules of each area 11.

However, as shown in FIG. 1 or 2, when number of areas 11 corresponding to display panels on glass substrate 10 is large, or number of types of signals of short-circuit bar in each area 11 is large, number of pads of PSVA mode display pad set 13 at border of glass substrate 10 is also large, resulting in increase in number of probes for applying voltage during PSVA test. As the number of PSVA test probes increases, probability of bad contact will also increase to cause PSVA curing anomaly, leading to defect rate of display panel. Besides, when number of areas 11 corresponding to display panels on glass substrate 10 is large, or number of types of signals of short-circuit bar in each area 11 is large, the overall design complexity of peripheral routes also increases

SUMMARY OF THE INVENTION

The technical issue to be addressed by the present invention is to provide a substrate for array process of panel display device, manufacturing method and corresponding liquid crystal display device, to reduce number of pads in peripheral routes and reduce number of PVSA test probes to simplify complexity of peripheral routes.

The present invention provides a substrate for array process of panel display device, which comprises: at least an area corresponding to display panel, which further comprising a plurality of scan lines, a plurality of data lines and a plurality of pixel units, the plurality of data lines and the plurality of scan lines being arranged in a checkerboard manner, each pixel unit electrically connected to a corresponding scan line and a corresponding data line; at least a shorting bar pad set, further comprising a plurality of pads, at least a part of pads electrically connected to the scan lines in a one-to-one correspondence manner, and the other part of pads electrically connected to data lines in a one-to-one correspondence manner; at least a cell switch, comprising a plurality of switches, each switch electrically connected to a corresponding pad; and a PSVA mode pad set, further comprising at least a scan pad, at least a data pad and at least a color filter (CF) pad; wherein a scan pad being electrically connected to at least two switches respectively, and through the at least two switches to select electrically connected to or disconnected from a same number of scan lines; a data pad being electrically connected to at least two switches respectively, and through the at least two switches to select electrically connected to or disconnected from a same number of data lines; the CF pad being electrically connected to location of a corresponding transfer structure located at border area of the substrate; each switch comprising: a first metal layer, electrically connected to a scan pad or a data pad; a second metal layer, disposed opposite to the first metal layer and electrically connected to a scan line or a data line, and an insulation layer, disposed between the first metal layer and the second metal layer; wherein before cell process, the insulation layer insulating the first metal layer and the second metal layer from each other to realize selection of electrical connection or disconnection between the switch and a scan line or a data line; during cell process, applying hard seal material to overlapping area of the first metal layer and the second metal layer so that the insulation layer being broken during pressing seal material to result in electrical connection between the first metal layer and the second metal layer to realize selection of electrical connection or disconnection between the switch and a scan line or a data line.

According to a preferred embodiment of the present invention, the PSVA mode pad set further comprises at least a common electrode pad, and each of the at least shorting bar pad set further comprises a common electrode pad, each of the at least a common electrode pad of the PSVA mode pad set is electrically connected through another switch of the at least a cell switch to each of common electrode pads of the at least a shorting bar pad set.

According to a preferred embodiment of the present invention, number of pads in PSVA mode pad set is four.

The present invention provides a method for manufacturing panel display device, which comprises: forming a plurality of scan lines, a plurality of data lines and a plurality of pixel units on an area corresponding to display panel, the plurality of data lines and the plurality of scan lines being arranged in a checkerboard manner, each pixel unit electrically connected to a corresponding scan line and a corresponding data line; forming at least a shorting bar pad set, at least a cell switch and a PSVA mode pad set, the at least a shorting bar pad set further comprising a plurality of pads, at least a part of pads electrically connected to the scan lines in a one-to-one correspondence manner, and the other part of pads electrically connected to data lines in a one-to-one correspondence manner, the at least a cell switch comprising a plurality of switches, each switch electrically connected to a corresponding pad; the PSVA mode pad set comprising at least a scan pad, at least a data pad and at least a color filter (CF) pad; wherein a scan pad being electrically connected to at least two switches respectively, and a data pad being electrically connected to at least two switches respectively; and electrically conducting switches in the cell switch to use the scan pads and the data pads in the PSVA mode pad set to perform pretilt angle processing of liquid crystal molecules.

According to a preferred embodiment of the present invention, a step prior to the step of electrically conducting switches in the cell switch comprises: using the shorting bar pad set to perform test on scan lines and data lines correspondingly connected to shorting bar pad set.

According to a preferred embodiment of the present invention, each of the switches comprises: a first metal layer, electrically connected to a scan pad or a data pad; a second metal layer, disposed opposite to the first metal layer and electrically connected to a scan line or a data line, and an insulation layer, disposed between the first metal layer and the second metal layer; wherein before cell process, the insulation layer insulating the first metal layer and the second metal layer from each other to realize selection of electrical connection or disconnection between the switch and a scan line or a data line; during cell process, applying hard seal material to overlapping area of the first metal layer and the second metal layer so that the insulation layer being broken during pressing seal material to result in electrical connection between the first metal layer and the second metal layer to realize selection of electrical connection or disconnection between the switch and a scan line or a data line.

According to a preferred embodiment of the present invention, the PSVA mode pad set further comprises at least a common electrode pad, and each of the at least shorting bar pad set further comprises a common electrode pad, each of the at least a common electrode pad of the PSVA mode pad set is electrically connected through another switch of the at least a cell switch to each of common electrode pads of the at least a shorting bar pad set.

According to a preferred embodiment of the present invention, the PSVA mode pad set further comprises a color filter pad, electrically connected to location of a corresponding transfer structure located at border area of the substrate.

According to a preferred embodiment of the present invention, number of pads in PSVA mode pad set is four.

The present invention provides a liquid crystal display panel, which comprises: an array substrate, a color filter substrate and a liquid crystal layer sandwiched between the array substrate and the color filter substrate; the array substrate further comprising: at least an area corresponding to display panel, which further comprising a plurality of scan lines, a plurality of data lines and a plurality of pixel units, the plurality of data lines and the plurality of scan lines being arranged in a checkerboard manner, each pixel unit electrically connected to a corresponding scan line and a corresponding data line; a shorting bar pad set, further comprising a plurality of pads, at least a part of pads electrically connected to the scan lines in a one-to-one correspondence manner, and the other part of pads electrically connected to data lines in a one-to-one correspondence manner; a cell switch, disposed outside of the area corresponding display panel, comprising a plurality of switches, each switch electrically connected to a corresponding pad; wherein one end of at least two switches being electrically connected, and the other end of the at least two switches through the at least two switches to select electrically connected to or disconnected from a same number of scan lines; one end of at least two other switches being electrically connected, and the other end of the at least two other switches through the at least two switches to select electrically connected to or disconnected from a same number of data lines.

According to a preferred embodiment of the present invention, each of the switches comprises: a first metal layer, electrically connected to a scan pad or a data pad; a second metal layer, disposed opposite to the first metal layer and electrically connected to a scan line or a data line, and an insulation layer, disposed between the first metal layer and the second metal layer; wherein before cell process, the insulation layer insulating the first metal layer and the second metal layer from each other to realize selection of electrical connection or disconnection between the switch and a scan line or a data line; during cell process, applying hard seal material to overlapping area of the first metal layer and the second metal layer so that the insulation layer being broken during pressing seal material to result in electrical connection between the first metal layer and the second metal layer to realize selection of electrical connection or disconnection between the switch and a scan line or a data line.

According to a preferred embodiment of the present invention, the PSVA mode pad set further comprises at least a common electrode pad, and each of the at least shorting bar pad set further comprises a common electrode pad, each of the at least a common electrode pad of the PSVA mode pad set is electrically connected through another switch of the at least a cell switch to each of common electrode pads of the at least a shorting bar pad set.

According to a preferred embodiment of the present invention, the PSVA mode pad set further comprises a color filter pad, electrically connected to location of a corresponding transfer structure located at border area of the substrate.

According to a preferred embodiment of the present invention, number of pads in PSVA mode pad set is four.

The efficacy of the present invention is that to be distinguished from the state of the art. The present invention is only required to dispose at least a scan pad and a data pad in PSVA mode pad set to work with switches of cell switch to apply voltage respectively to a plurality of scan lines and data lines of an area corresponding to display panel to form pretilt angle of liquid crystal molecules. In other words, the present invention is not required to, as known techniques, to dispose a same number of scan pads for scan lines of corresponding area in PSVA mode pad set, and a same number of data pads for data lines. Hence, number of pads in PSVA mode pad set is greatly reduced.

In an exemplary embodiment of the present invention, only four pads are required for the PSVA mode pad set, i.e., scan pad, data pad, common electrode pad and CF pad. The number of pads is greatly reduced and peripheral routes are simplified to improve the yield rate of PSVA process. Also, the PSVA mode pad set of the present invention includes, similar to the known technique, four types of pads, and can be adjusted flexibly to test voltage.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
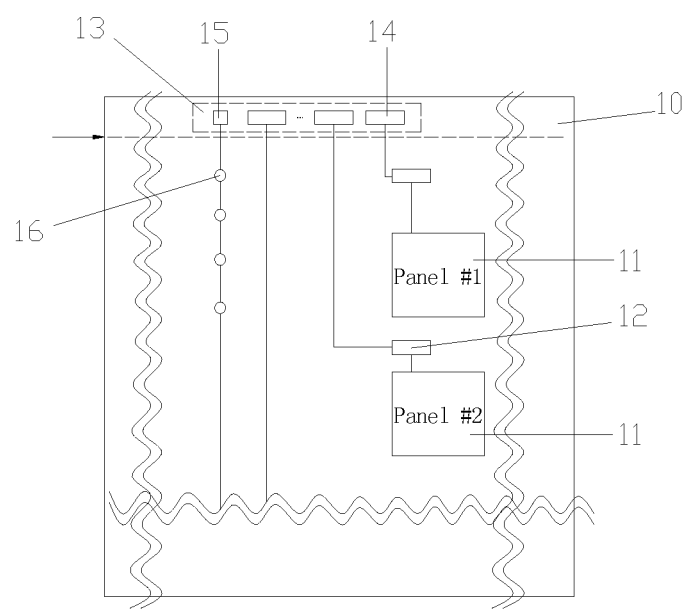
FIG. 1 is a schematic view showing the structure of a substrate for array process of a panel display device of a known technique.
Figure 2:
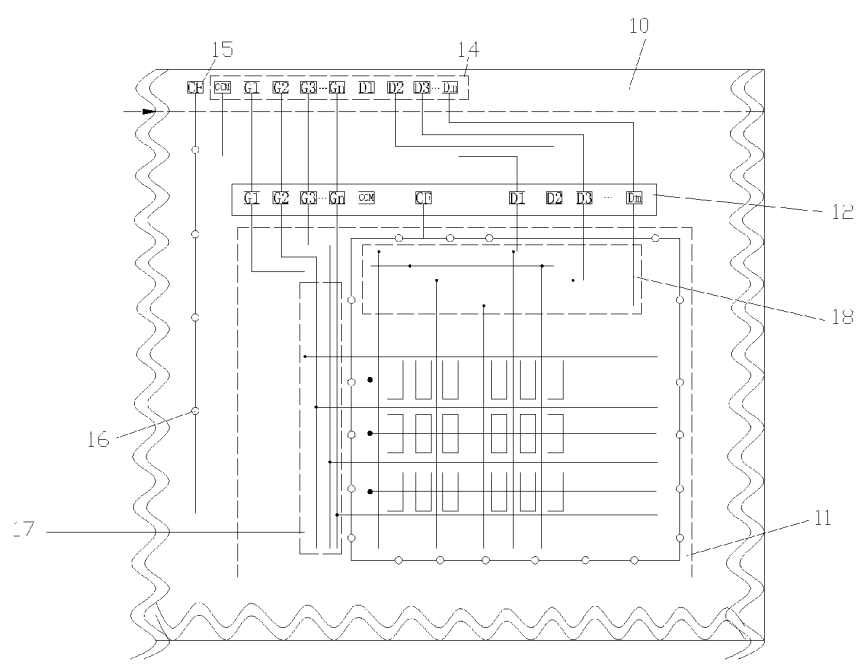
FIG. 2 is a schematic view showing the detailed structure of a substrate for array process of a panel display device of a known technique.
Figure 3:
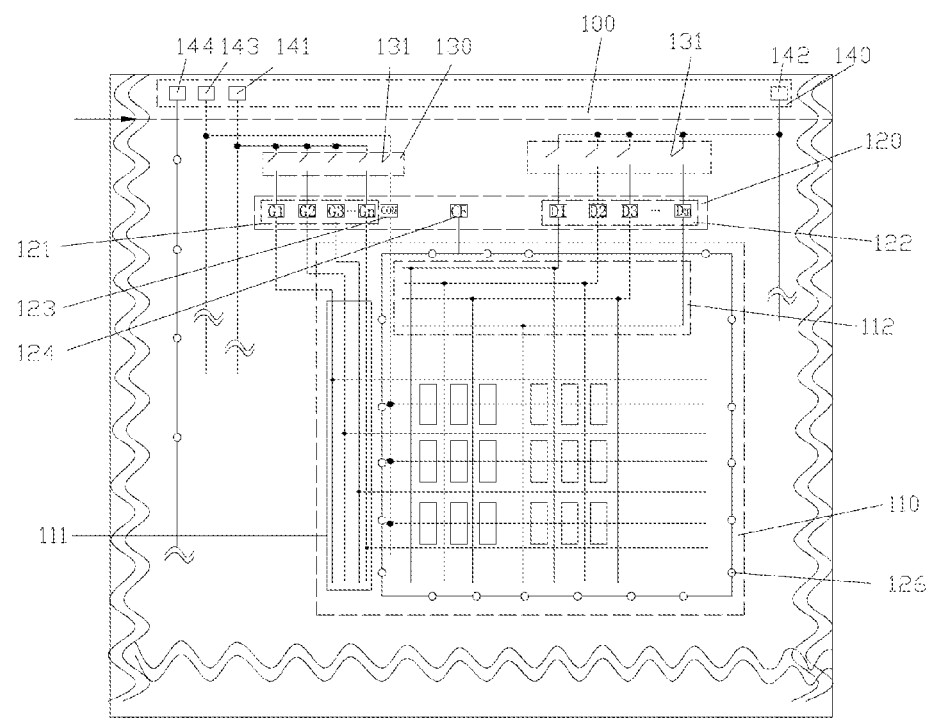
FIG. 3 is a schematic view showing the structure of a substrate for array process of a panel display device according to the present invention.

FIG. 3 is a schematic view showing the structure of a substrate for array process of a panel display device according to the present invention. The substrate for array process of a panel display device according to the present invention is a glass substrate, and the display panel is a liquid crystal display device. As shown in FIG. 3, glass substrate 100 for array process of a panel display device according to the present invention at least includes an area 110 corresponding to a display panel, at least a shorting bar pad set 120, at least a cell switch 130 and a PSVA mode pad set 140.

In the instant embodiment, an example of glass substrate 100 disposed with an area 110 corresponding to a display panel is used for explanation. Area 110 includes a plurality of scan lines G1, G2, ..., Gn, a plurality of data lines D1, d2, ..., Dn and a plurality of pixel units (not shown), wherein scan lines G1, G2, ..., Gn, and data lines D1, d2, ..., Dn are disposed in a checkerboard manner, and each pixel unit is electrically connected respectively to at least a corresponding scan line and at least a corresponding data line.

Area 110 is further disposed with gate shorting bar (not shown) and data shorting bar (not shown) gathering a shorting bar pad set 120, wherein gate shorting bar includes a plurality of scan leads 111, electrically connected respectively to scan lines G1, G2, ..., Gn on area 110; data shorting bar includes a plurality of data leads 112, electrically connected respectively to data lines D1, D2, ..., Dm on area 110.

Shorting bar pad set 120 includes a plurality of pads. Specifically, as shown in FIG. 3, the pads of shorting bar pad set 120 can be divided into scan pad set 121 and data pad set 122, wherein scan pad set 121 includes scan pad G1, G2, ..., Gn, with each electrically connected respectively to a scan line of gate shorting bar; data pad set 122 includes scan pad D1, D2, ..., Dm, with each electrically connected respectively to a data line of data shorting bar.

In addition, shorting bar pad set 120 further includes a common electrode pad 123 and a color filter pad 124, wherein common electrode pad 123 is for electrical connection to common electrode disposed on area 110 or electrical connection through a transfer structure of area 110 to common electrode disposed on another substrate (color filter substrate). Color filter pad 124 is for electrical connection to location of transfer structure 126 of area 110. Transfer structure 126 is for vertically conducting signals between upper and lower electrode plates of display panel.

Cell switch 130 includes a plurality of switch 131, and each switch 131 is electrically connected respectively to a corresponding pad of shorting bar pad set 120.

PSVA mode pad set 140 includes at least a scan pad 141, at least a data pad 142 and at least a common electrode pad 143. Each of scan pads G1, G2, ..., Gn of scan pad set 121 of shorting bar pad set 120 is connected through a respective switch 131 to each of scan pads 141 of PSVA mode pad set 140; and each of data pads D1, D2, ..., Dm of data pad set 122 of shorting bar pad set 120 is connected through a respective switch 131 to each of data pads 142 of PSVA mode pad set 140.

In the instant embodiment, a scan pad 141 is electrically connected to at least two switches 131, and through the at least two switches 131 to select electrically connected to or disconnected from a same number of scan lines G1, G2, ..., Gn; and a data pad 142 is electrically connected to at least another two switches 131, and through the at least another two switches 131 to select electrically connected to or disconnected from a same number of data lines D1, D2, ..., Dm.

In other words, scan pad 141 of PSVA mode pad set 140, through a plurality of corresponding switches 131 of cell switch 130, selects to electrically connect to or disconnect from a same number of scan lines G1, G2, ..., Gn of area 110. Similarly, data pad 142 of PSVA mode pad set 140, through a plurality of corresponding switches 131 of cell switch 130, selects to electrically connect to or disconnect from a same number of data lines D1, D2, ..., Dm of area 110.

Common electrode pad 123 of shorting bar pad set 120, through corresponding switch 131, is electrically connected to common electrode pad 143 of PSVA mode pad set 140.

In addition, PSVA mode pad set 140 can further include a color filter pad 144, electrically connected and disposed in border area of glass substrate 100 corresponding to locations of a plurality of transfer structures 126.

Therefore, with applying voltage to scan pad 141 of PSVA mode pad set 140 and conducting switches 131 of cell switch 130 corresponding to scan lines G1, G2, ..., Gn, the voltage can be transferred to scan lines G1, G2, ..., Gn of area 110 to perform pretilt angle of liquid crystal molecules in cell process.

Similarly, with applying voltage to data pad 142 of PSVA mode pad set 140 and conducting switches 131 of cell switch 130 corresponding to data lines D1, D2, ..., Dm, the voltage can be transferred to data lines D1, D2, ..., Dm of area 110 to perform pretilt angle of liquid crystal molecules in cell process.

Figure 4:
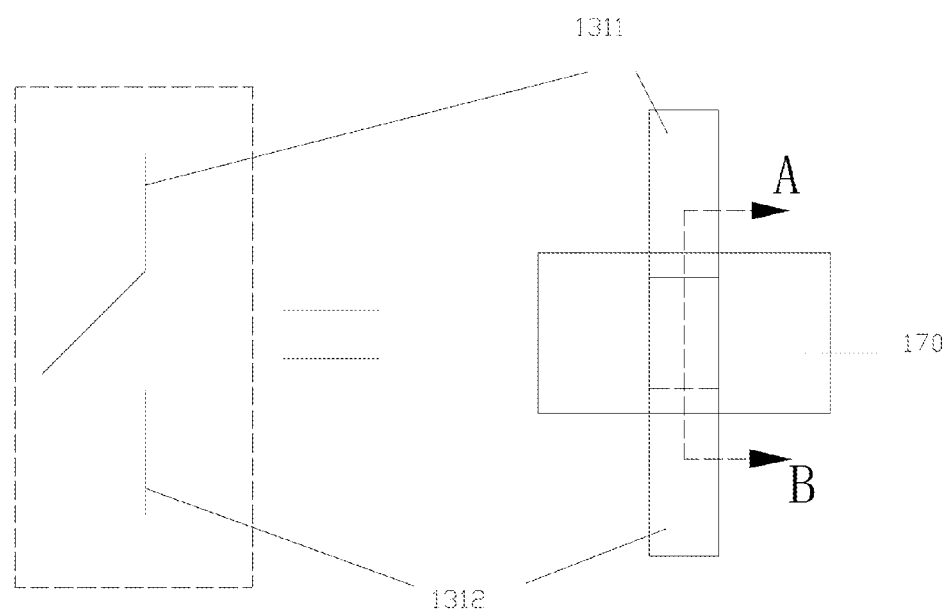
FIG. 4 is a planar schematic view of switch of FIG. 3, wherein left hand side is an equivalent circuit of the structure on right hand side.
Figure 5:
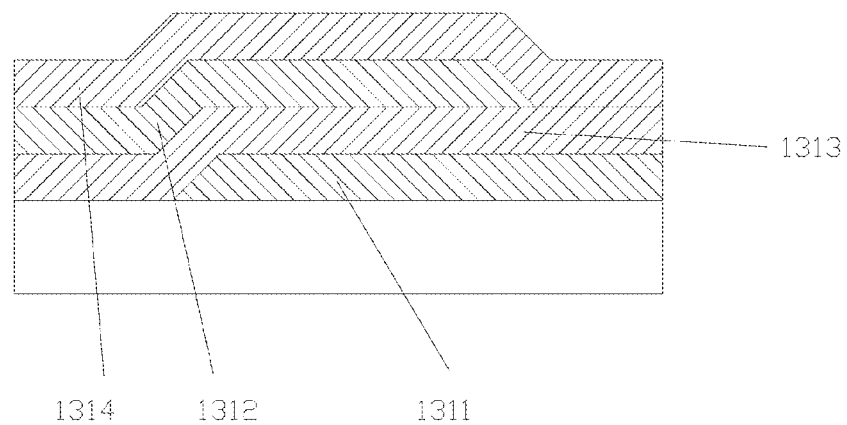
FIG. 5 is a cross-sectional view of switch of FIG. 4 along AB direction during electrical disconnection.
Figure 6:
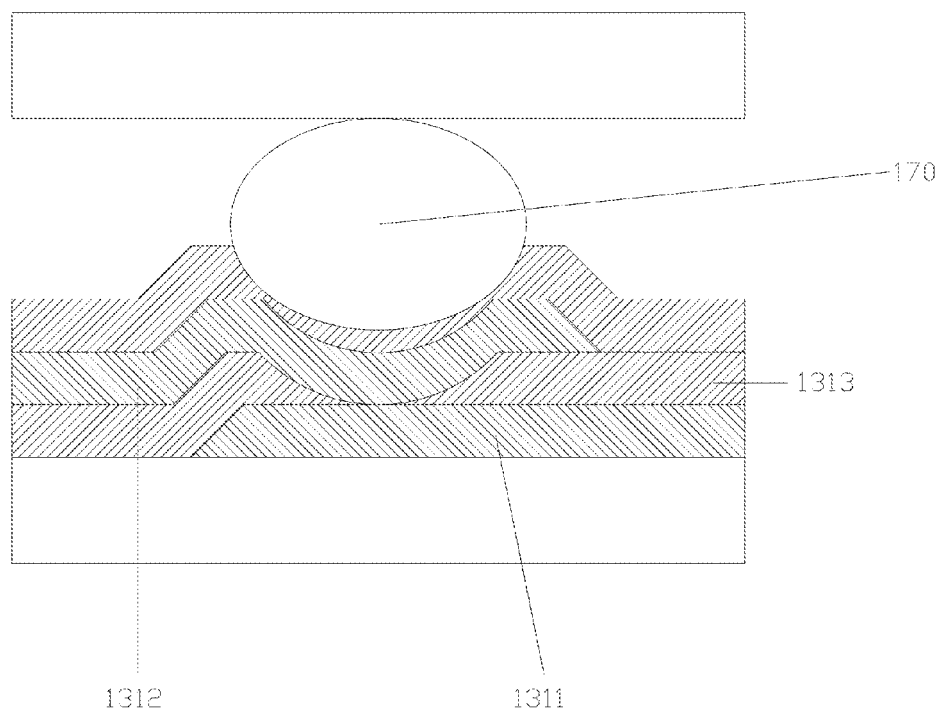
FIG. 6 is a cross-sectional view of switch of FIG. 4 along AB direction during electrical connection.

FIGS. 4-6 show schematic views of switch of FIG. 3. As shown in FIGS. 4-5, in the instant embodiment, switch 131 includes a first metal layer 1311, a second metal layer 1312, disposed opposite to first metal layer 1311, and an insulation layer 1313, sandwiched between two metal layers. First metal layer 1311 is electrically connected to scan pad 141 or data pad 142, and second metal layer 1312 is electrically connected to scan pad 141 or data pad 142. Before cell process, switch 131 uses insulation layer 1313 to insulate first metal layer 1311 and second metal layer 1312 from each other to make switch 131 non-conductive and realize selection of electrical disconnection between switch 131 and corresponding scan line or data line to enable gate shorting bar and data shorting bar for array test. Therefore, by using electrically insulated first metal layer 1311 and second metal layer 1312 of switch 131, the embodiment can make every two pads of shorting bar pad set 120 independent. Without electrical connection, array test function of shorting bar pad set 120 is preserved.

In addition, switch 131 can further include a passive layer 1314, disposed op top of second metal layer 1312.

It should be understood that first metal layer 1311, second metal layer 1312 and insulation layer 1313 of switch 131 can be formed simultaneously with other electronic components of area 110, such as, scan lines, data lines and in-between insulation layers during manufacturing process.

As shown in FIG. 6, in cell process, a hard seal material 170, such as fiber or spacer, can be applied to an overlapping area of first metal layer 1311 and second metal layer 1312 of switch 131. Therefore, during cell process, hard seal material 170 is pressed to partially penetrate insulation layer 1313 between first metal layer 1311 and second metal layer 1312 to make two metal layers electrically connected, i.e., switch 131 conductive and realizing selection of electrical connection between switch 131 and corresponding scan line or data line.

Therefore, the present invention is only required to dispose a scan pad 141 and a data pad 142 in PSVA mode pad set 140 to work with switches 131 of cell switch 130 to apply voltage respectively to a plurality of scan lines G1, G2, ..., Gn and data lines D1, D2, ..., Dm of an area 110 to perform test. In other words, the present invention is not required to, as known techniques, to dispose a same number of scan pads 141 for scan lines G1, G2, ..., Gn of corresponding area in PSVA mode pad set 140, and a same number of data pads 142 for data lines D1, D2, ..., Dm. Hence, number of pads in PSVA mode pad set 140 is greatly reduced. Hence, in a specific embodiment, each scan line G1, G2, ..., Gn is connected to a switch 131 correspondingly, and each data line D1, D2, ..., Dm is connected to a switch 131 correspondingly. In addition, one scan pad 141 is connected respectively to all switches 131 corresponding to all scan lines G1, G2, ..., Gn, and one data pad 142 is connected respectively to all switches 131 corresponding to all data lines D1, D2, ..., Dm. At this point, PSVA mode pad set 140 only includes four pads, i.e., scan pad 141, data pad 142, common electrode pad 143 and color filter pad 144. The number of pads is greatly reduced and peripheral routes are simplified to improve PSVA process yield rate. In addition, PSVA mode pad set 140 of the present invention still includes, similar to the known technique, four types of pads, and can be adjusted flexibly to test voltage.

Furthermore, the embodiment of the present invention uses glass substrate 100 disposed with an area 110 corresponding to a display panel for description. It is understood that glass substrate 100 can be disposed with a plurality of areas 110, a plurality of shorting bar pad sets 120, and a plurality of cell switches 130, wherein each area 110 corresponding to display panel is connected to a PSVA mode pad set 140 through a corresponding shorting bar pad set 120 and a corresponding cell switch 130.

In addition, the present invention also provides a method for manufacturing a panel display device, forming structures of FIG. 3 on substrate 100 accordingly, and first keeping two metal layers of switch 131 of cell switch 130 insulated to use shorting bar pad set 120 for array testing. Then, after passing test, the method enables switches conductive in the cell switch, i.e., to make two metal layers of switches 131 of cell switch 130 electrically connected by pressing, and then uses scan pad 141 and data 142 of PSVA mode pad set 140 to apply voltage for forming pretilt angle of liquid crystal molecules to accomplish alignment.

In addition, it should be understood that after the above test, substrate 100 is cut, i.e., cutting off PSVA mode pad set, and then to produce corresponding liquid crystal display panel. In other words, the manufactured liquid crystal display panel includes an array substrate, a color filter substrate and a liquid crystal layer sandwiched between the array substrate and the color filter substrate. The array substrate includes aforementioned area 110 corresponding to the display panel, shorting bar pad set 120 and cell switch 130.

Specifically, manufactured liquid crystal display panel includes an array substrate, a color filter substrate and a liquid crystal layer sandwiched between the array substrate and the color filter substrate (all not shown).

As shown in FIGS. 3-6, array substrate includes the following:

An area 110 corresponding to display panel, which further comprising a plurality of scan lines G1, G2, ..., Gn, a plurality of data lines D1, D2, ..., Dn and a plurality of pixel units (not shown), the plurality of data lines D1, D2, ..., Dn and the plurality of scan lines G1, G2, ..., Gn being arranged in a checkerboard manner, each pixel unit electrically connected to a corresponding scan line and a corresponding data line;

A shorting bar pad set 120, disposed outside of area 110 corresponding display panel, further comprising a plurality of pads, at least a part of pads electrically connected to the scan lines G1, G2, ..., Gn in a one-to-one correspondence manner, and the other part of pads electrically connected to data lines D1, D2, ..., Dn in a one-to-one correspondence manner;

A cell switch 130, disposed outside of area 110 corresponding display panel, comprising a plurality of switches 131, each switch 131 electrically connected to a corresponding pad;

Wherein, after cutting of PSVA mode pad set 140, one end of at least two switches 131 being electrically connected, and the other end of the at least two switches 131 through the at least two switches 131 to select electrically connected to or disconnected from a same number of scan lines G1, G2, ..., Gn;

Similarly, after cutting of PSVA mode pad set 140, one end of at least two other switches 131 being electrically connected, and the other end of the at least two other switches 131 through the at least two switches 131 to select electrically connected to or disconnected from a same number of data lines D1, D2, ..., Dn.

Obviously, it should be understood that when cutting panel, shorting bar pad set 120 and cell switch 130 are also cut off so that the manufactured liquid crystal display panel does not include shorting bar pad set 120 and cell switch 130.

It is noted that, switch 131 of the present invention can be as aforementioned two overlapping metal layers, insulated at some point of time and pressed to become electrically connected at other point of time. Switch 131 can also be realized by other switches, such as, a triode.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A method of manufacturing panel display device, further comprises:

forming a plurality of scan lines, a plurality of data lines and a plurality of pixel units on an area corresponding to display panel, the plurality of data lines and the plurality of scan lines being arranged in a checkerboard manner, each pixel unit electrically connected to a corresponding scan line and a corresponding data line;

forming at least a shorting bar pad set, at least a cell switch and a PSVA mode pad set, the at least a shorting bar pad set further comprising a plurality of pads, a part of the plurality of pads being electrically connected to the scan lines in a one-to-one correspondence manner, and another part of the plurality of pads being electrically connected to data lines in a one-to-one correspondence manner, the at least a cell switch comprising a plurality of switches, each switch electrically connected to a corresponding pad; the PSVA mode pad set comprising at least a scan pad and at least a data pad; wherein the scan pad is electrically connected to at least two of the plurality of switches, the at least two of the plurality of switches are further respectively electrically connected to same number of pads of the shorting bar pad set electrically connected to the scan lines in one-to-one correspondence manner, and thereby the at least two of the plurality of switches are electrically connected between the scan pad and at least two pads of the shorting bar pad set; and wherein the data pad is electrically connected to at least another two of the plurality of switches, the at least another two of the plurality of switches are further respectively electrically connected to same number of pads of the shorting bar pad set electrically connected to the data lines in one-to-one correspondence manner, and thereby the at least another two of the plurality of switches are electrically connected between the data pad and at least two pads of the shorting bar pad set; and electrically conducting switches in the cell switch to use the scan pads and the data pads in the PSVA mode pad set to perform pretilt angle processing of liquid crystal molecules;

each of the switches comprises:
   a first metal layer, electrically connected to a scan pad or a data pad;
   a second metal layer, disposed opposite to the first metal layer and electrically connected to a scan line or a data line; and
   an insulation layer, disposed between the first metal layer and the second metal layer;
   wherein before cell process, the insulation layer insulating the first metal layer and the second metal layer from each other to realize selection of electrical connection or disconnection between the switch and a scan line or a data line;
   during cell process, applying hard seal material to overlapping area of the first metal layer and the second metal layer so that the insulation layer being broken during pressing material to result in electrical connection between the first metal layer and the second metal layer to realize selection of electrical connection or disconnection between the switch and a scan line or a data line.

2. The method as claimed in claim 1, characterized in that a step prior to the step of electrically conducting switches in the cell switch comprises: using the shorting bar pad set to perform test on scan lines and data lines correspondingly connected to shorting bar pad set.

3. The method as claimed in claim 1, characterized in that the PSVA mode pad set further comprises at least a common electrode pad, and each of the at least shorting bar pad set further comprises a common electrode pad, each of the at least a common electrode pad of the PSVA mode pad set is electrically connected through another switch of the at least a cell switch to each of common electrode pads of the at least a shorting bar pad set.

4. The method as claimed in claim 1, characterized in that the PSVA mode pad set further comprises a color filter pad, electrically connected to location of a corresponding transfer structure located at border area of the substrate.

5. The method as claimed in claim 1, characterized in that the PSVA mode pad set comprises four pads.

* * * * *